Figure 4:
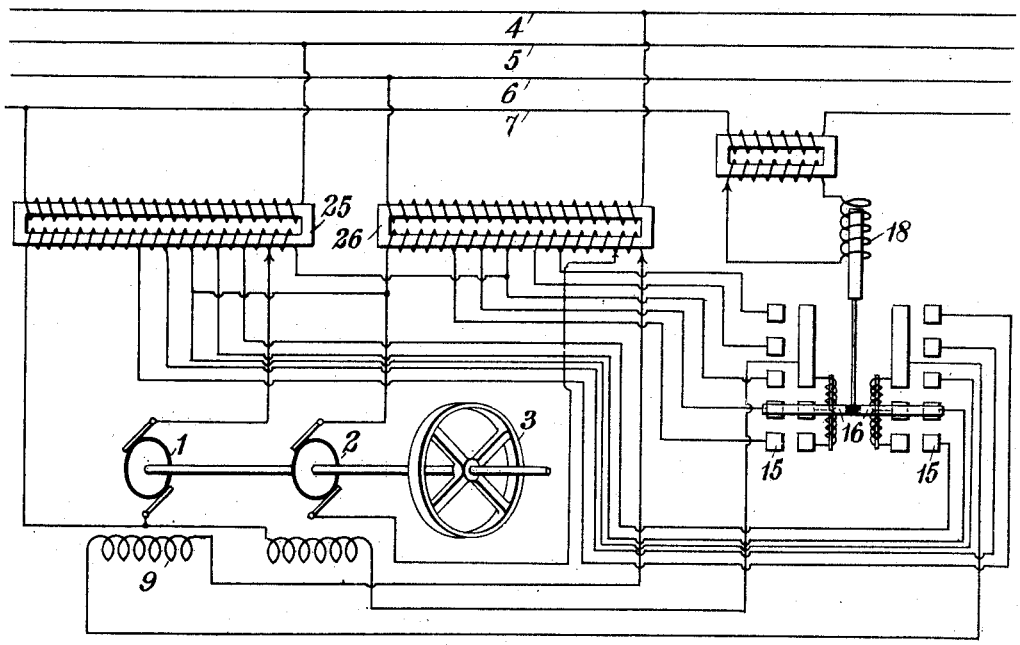

O. S. SCHAIRER.
ELECTRICAL EQUALIZER SYSTEM.
APPLICATION FILED SEPT. 3, 1907. RENEWED MAY 20, 1910.
977,554.
Patented Dec. 6, 1910.
2 SHEETS—SHEET 1.
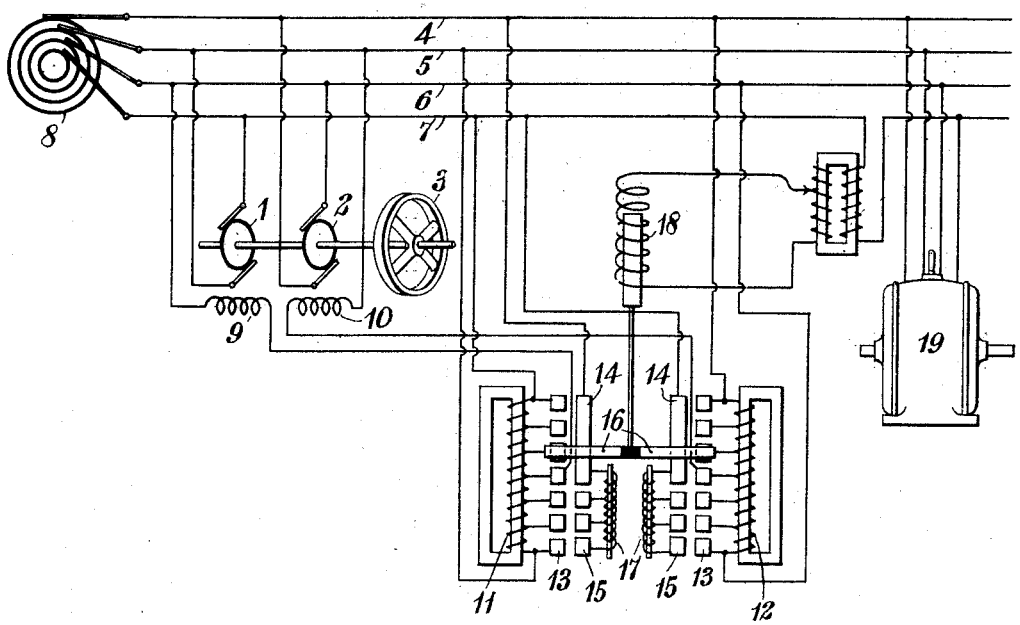
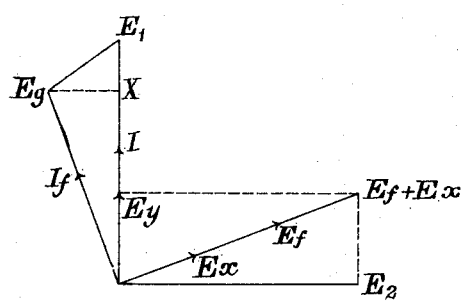
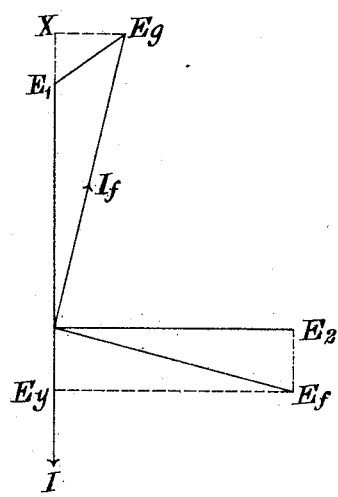
WITNESSES:
C. L. Belcher
R. J. Dearborn
INVENTOR
Otto S. Schairer
BY
Wesley G. Carr
ATTORNEY O. S. SCHAIRER.
ELECTRICAL EQUALIZER SYSTEM.
APPLICATION FILED SEPT. 3, 1907. RENEWED MAY 20, 1910.

977,554.

Patented Dec. 6, 1910.

2 SHEETS—SHEET 2.

WITNESSES:

INVENTOR
Otto S. Schairer
BY
ATTORNEY

NITED STATES PATENT OFFICE.

OTTO S. SCHAIRER, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRICAL EQUALIZER SYSTEM.

977,554.  Specification of Letters Patent.  Patented Dec. 6, 1910.

Application filed September 3, 1907, Serial No. 391,211. Renewed May 20, 1910. Serial No. 562,524.

*To all whom it may concern:*

Be it known that I, OTTO S. SCHAIRER, a citizen of the United States, and a resident of Pittsburg, in the county of Allegheny and State of Pennsylvania, have invented a new and useful Improvement in Electrical Equalizer Systems, of which the following is a specification.

My invention relates to systems of electrical distribution, and particularly to means for equalizing the load upon the generating or supply station when the load upon the system is variable.

The object of my invention is to provide simple and effective means to be employed in connection with alternating current systems of any number of phases, for absorbing or yielding energy in accordance with variations in load upon the system, in such a manner that the load upon the generating or supply station of the system may remain substantially constant or may not exceed a predetermined value.

It has heretofore been proposed to employ fly-wheels or other devices having considerable inertia, in systems of distribution that supply translating devices requiring widely varying amounts of power, and to so drive the fly-wheels and control their operation that the load upon the distributing circuit will remain substantially constant, regardless of the variations in the amount of power required by the translating devices.

In the present system, a dynamo-electric machine, that may operate either as a motor or as a generator and to which a fly-wheel is mechanically coupled, is directly connected to the distributing circuit without the intervention of a rotary converter or other device, and the arrangement is such that but comparatively small and inexpensive machines need be provided and only a single equalizer set is necessary for equalizing the load provided by a plurality of translating devices.

The invention is especially adapted for use in connection with alternating current systems of distribution and, in its most useful embodiment, it comprises a plurality of mechanically coupled dynamo-electric machines of the commutator type, one for each phase of the system of distribution, a flywheel being also coupled to the said machines. The armatures of the machines are connected, respectively, to the various phases of the distributing circuit, and the field magnet windings are connected to phases of the circuit other than those to which the corresponding armatures are connected, in order that the generated and counter electromotive forces of the armatures may be nearly of the same phases as the electromotive forces of the circuits to which they are connected. The machines are caused to operate alternately as motors and generators by adjusting their field strengths automatically, or otherwise, in accordance with the variations in the load afforded by the translating devices, energy being stored in the fly-wheel when operating the machines as motors and yielded for operating the machines as generators, in order to supply current to the system.

It is not only desirable that the armature electromotive forces should be nearly of the same phase as those of the circuits to which they are connected, but also, under the most usual conditions, that the currents in the armature circuits be of approximately the same phases as the electromotive forces of the circuits to which the armatures are connected, and this result is also insured in the present invention under substantially all conditions of load and whether the machines operate as motors or as generators.

The present invention is a modification of the broad idea of another, whereby the aforesaid results may be effected, and it is intended to provide more simple and inexpensive apparatus for the purpose than has been provided by others.

Figure 5:
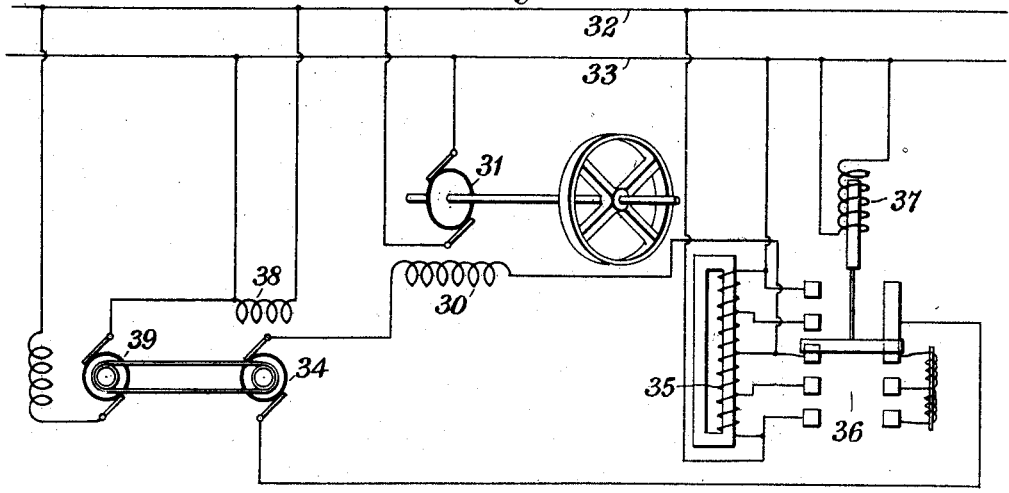

Figure 1 of the accompanying drawings is a diagrammatic view of a system of distribution that embodies my invention. Figs. 2 and 3 are vector diagrams illustrating the phase relations of the currents and electromotive forces of the system shown in Fig. 1. Fig. 4 is a diagrammatic view of a modification of the system shown in Fig. 1, and Fig. 5 is a similar view of a single-phase system of distribution in which the invention may be employed.

Armatures 1 and 2 of two dynamo-electric machines of the commutator type of construction are mechanically coupled together and to a fly-wheel 3 or other means whereby considerable inertia is imparted to the rotatable system, and they are electrically connected between different pairs of conductors of a distributing circuit 4—5—6—7 that is supplied from a generator 8 or other suitable source. Field magnet windings 9 and 10 of the dynamo-electric machines are connected, respectively, between other conductors of the circuit 4—5—6—7 than those to which the corresponding armatures are connected and intermediate points of subdivided transformer windings 11 and 12 that are connected between the same conductors of the supply circuit 4—5—6—7 as the corresponding armatures. The points of subdivision of the windings 11 and 12 are connected, respectively, to stationary contact terminals 13 of a controller that comprises, further, stationary contact strips 14 disposed adjacent to the terminals 13, stationary contact terminals 15 arranged in alinement with the strips 14 and adjacent to certain of the terminals 13, and movable conducting members 16 that are movable over the stationary contact terminals and strips. The contact terminals 15 and the strips 14 of each set are connected to suitable points of subdivision of impedance devices 17, preferably having the same power factors as the field magnet windings in circuit with which they may be connected. The strips 14 are connected, respectively, to conductors 4 and 7 of the distributing circuit. The conducting members 16 are adjusted in position by means of an electro-magnet 18 to which current is supplied that is proportional in amount to the current which traverses the distributing circuit 4—5—6—7 and is supplied to any suitable load, such as an induction motor 19, or other device.

It will be noted that, when the conducting members 16 engage the lower ends of the stationary strips 14, the field magnet windings 9 and 10 are connected to different phases of the distributing circuit than those to which the corresponding armatures are connected, and, consequently, the electromotive forces applied, respectively, to the field magnet and armature windings of each motor are 90° out of phase with each other. Since the field magnet windings of machines of the type here employed are almost entirely inductive, the currents therein will lag substantially 90° in phase behind the electromotive forces applied thereto, and for this reason the counter and generated electromotive forces in the armatures 1 and 2 will be substantially in phase with those of the conductors to which the armatures are connected. However, because of the inductances unavoidably present in the armature circuits, the currents in the armature circuits may be considerably out of phase with the electromotive forces of the conductors to which the armatures are connected, and the phase differences will vary with variations in the amount of current traversing the armature circuits. It is therefore desirable that the counter and generated electromotive forces of the armatures be so displaced with respect to the electromotive forces of the conductors to which the armatures are connected, for each load, and for operation of the machines as motors and generators, that the currents in the armature circuits may always agree approximately in phase with the electromotive forces of the conductors to which the armatures are connected. It will usually be found, in order to effect this result, that the counter electromotive forces, when operating the machines as motors, should lag in phase behind the electromotive forces of the conductors to which the armatures are connected, and should lead the said electromotive forces for generator operation. This result is effected, in the present instance, by means of the controller that is actuated by the magnet winding 18 in response to variations in the amount of current required of the distributing circuit by the load 19, the conducting members 16 being raised to their upper positions in order to cause the dynamo-electric machines to operate as generators and supply the current in excess of the predetermined amount when the current required by the load 19 exceeds the said predetermined amount. When the load is less than the predetermined amount, the conducting members 16 are permitted to drop to their lower positions so as to include, in the field circuit, portions of the impedance devices 17, whereby the strength of the field magnet windings 9 and 10 are reduced, and the machines are caused to operate as motors and to store energy in the fly-wheel 3 for use subsequently to drive the machines as generators.

It will be noted that, for motor operation, portions of the transformer windings 11 are included in the field magnet circuit below the intermediate points to which the terminals of the said windings are connected, and for generator operation, portions of the transformer windings above the said intermediate points are included in the field magnet circuits. Since the electromotive forces impressed upon the transformer windings differ in phase from those of the circuits to which the field magnet windings are connected when the conducting members 16 engage the lower ends of the stationary strips 14, the phases of the electromotive forces applied to the field magnet windings are modified with changes in the load upon the distributing circuit, and the electromotive forces applied to the field circuits by the transformer windings are reversed in phase when changing from motor to generator operation, and vice versa.

These conditions will be readily understood from a consideration of the vector diagrams of Figs. 2 and 3, in which $E_1$ and $E_2$ represent the line voltages of those of the distributing circuit 4—5—6—7, $E_1$ being that of the circuit to which the armature of the machine is connected. $E_f$ represents the electromotive force applied to the field winding. $E_x$ represents the electromotive force applied to the impedance device 17 that is inserted in the field circuit when operating the machine as a motor. It is evident that, if the power factor of the impedance device is the same as that of the field winding, electromotive forces $E_x$ and $E_f$ will agree in phase, and no shifting of the phase relations will be effected by including the impedance device in circuit with the field winding. It will, however, be understood that it is not essential, under all conditions, that the power factor of the impedance device be the same as that of the field winding, because the shifting of the phase relations that would otherwise result may readily be compensated for in the remainder of the system. $E_y$ represents the electromotive force impressed upon the field magnet circuit by the transformer 11. $E_g$ represents the generated electromotive force when the machine operates as a generator and the counter electromotive force when the machine operates as a motor. $I_f$ represents the field current which is substantially 90° in phase behind the field electromotive force $E_f$, because in practice the ohmic resistance of the field magnet winding is very low as compared with its inductive resistance. The electromotive force $E_g$ is in phase with the field current $I_f$. I represents the current in the armature circuit. $E_1 E_g$ represents the impedance drop in the armature circuit. $E_1 X$ represents the resistance component of the impedance drop, $E_1$—$E_g$, and is in phase with the current I. It is opposed to, and is overcome by, the line electromotive force, $E_1$, when the machine operates as a motor, and it is overcome by the generated electromotive force, $E_g$, when the machine operates as a generator, so that it is then added to the line electromotive force, $E_1$. $E_g X$ is the inductive drop in the armature circuit, or the inductive component of the impedance drop, $E_1 E_g$, and it is therefore 90° out of phase with the current I. It will thus be seen that the desired shifting of the phase of the electromotive force $E_g$, when changing from motor to generator operation and vice versa, is effected by reversing the phase of the electromotive force $E_y$ that is impressed upon the field circuit by the transformer 11, and that the value of this electromotive force is increased for generator operation with an increase in the amount of current required by the translating devices, and is increased with a decrease of current required by the translating devices when the machine operates as a motor.

It may be desirable, at times, when the voltage of the distributing circuit 4—5—6—7 is high, to introduce transformers 25 and 26 into the circuit between the distributing circuit 4—5—6—7 and the dynamo-electric machine, as in Fig. 4, in which case it becomes unnecessary to provide additional transformers for effecting phase adjustment of the electromotive forces applied to the field magnet windings, since the auxiliary electromotive forces which are out of phase with the main electromotive forces applied to the field circuit may be supplied by the main transformers 25 and 26. For this reason, in Fig. 4, the main transformer windings 25 and 26 are subdivided, and the several points of subdivision thereof are connected, respectively, to the stationary contact terminals 15 of the controller, the members 16 of which are actuated by the magnet winding 18, as in Fig. 1, the remainder of the controller being substantially identical with that of Fig. 1. In this case, terminals of the field magnet windings are connected, respectively, to intermediate points of the transformer windings 25 and 26. The mode of operation of the system of Fig. 4 is identical with that of Fig. 1 and it will, therefore, not be described more in detail. In this arrangement, the points of connection of the armatures with the transformer windings may be adjusted.

The invention may also be embodied in a single-phase system, as shown in Fig. 5, in which the field magnet winding 30 of a dynamo-electric machine, the armature 31 of which is connected to distributing circuit 32—33, is supplied with exciting current from a generator 34, the electromotive force of which is substantially 90° out of phase with that of the circuit 32—33. An auxiliary electromotive force is applied to the field circuit by means of a transformer winding 35 that is connected to the circuit 32—33, the value of said electromotive force being adjusted and its phase reversed by means of a controller 36 that is actuated by means of a magnet winding 37 included in series with the conductor 33, the said controller being similar in construction and operation to one-half of the controller shown in Fig. 1. Field magnet winding 38 of the generator 34 is supplied from the circuit 32—33 and the generator 34 is driven by means of a series motor 39 that is also supplied from the circuit 32—33. The mode of operation of this system is substantially identical with that of the systems shown in Figs. 1 and 4 and needs no further description.

I claim as my invention:

1. The combination with an alternating current distributing circuit, and a dynamo-electric machine adapted to operate either as a motor or as a generator and having its armature connected to said circuit, of means for applying to the circuit of the field magnet winding of the machine an electromotive force of a different phase from that applied to the armature, means for impressing upon the field circuit an auxiliary electromotive force derived from the circuit to which the armature is connected, and means responsive in operation to variations in the amount of current traversing the distributing circuit for adjusting the value of said auxiliary electromotive force and reversing its phase when changing from motor to generator operation, and vice versa.

2. The combination with an alternating current distributing circuit, and a dynamo-electric machine adapted to operate either as a motor or as a generator and having its armature connected to said circuit, of means for applying to the circuit of the field magnet winding of the machine an electromotive force of a different phase from that applied to the armature, a transformer winding for impressing upon the field circuit an auxiliary electromotive force derived from the circuit to which the armature is connected, and means for adjusting the connections to the transformer winding to vary the value of the said auxiliary electromotive force and to reverse its phase when changing from motor to generator operation, and vice versa.

3. The combination with an alternating current distributing circuit, and a dynamo-electric machine adapted to operate either as a motor or as a generator and having its armature connected to said circuit, of means for applying to the circuit of the field magnet winding of the machine an electromotive force of a different phase from that applied to the armature, and means for impressing upon the field circuit an auxiliary electromotive force derived from the circuit to which the armature is connected of opposite phase for motor and for generator operation.

4. The combination with an alternating current distributing circuit, and mechanically coupled dynamo-electric machines adapted to operate either as motors or as generators each of which has its field magnet and armature windings supplied from different phases of said circuit, of means for impressing upon the circuits of the field magnet windings auxiliary electromotive forces that are out of phase with the main electromotive forces applied thereto, and means for adjusting the values of the auxiliary electromotive forces and for reversing the phases thereof when changing from motor to generator operation, and vice versa.

5. The combination with an alternating current distributing circuit, and mechanically coupled dynamo-electric machines adapted to operate either as motors or as generators each of which has its field magnet and armature windings supplied from different phases of said circuit, of means for impressing upon the circuits of the field magnet windings auxiliary electromotive forces that are out of phase with the main electromotive forces applied thereto, and means responsive in operation to variations in the amount of current traversing the distributing circuit for adjusting the values of the auxiliary electromotive forces and reversing the phases thereof.

6. The combination with an alternating current distributing circuit, and mechanically coupled dynamo-electric machines adapted to operate either as motors or as generators each of which has its field magnet and armature windings supplied from different phases of said circuit, of transformer windings for applying to the field circuits auxiliary electromotive forces that are out of phase with the main electromotive forces applied thereto, and means for adjusting the connections to the transformer windings to adjust the values of the auxiliary electromotive forces and to reverse the phases thereof when changing from motor to generator operation, and vice versa.

In testimony whereof, I have hereunto subscribed my name this 29th day of August, 1907.

OTTO S. SCHAIRER.

Witnesses:
R. J. DEARBORN,
BIRNEY HINES.